United States Patent
Currie

(10) Patent No.: US 10,021,836 B2
(45) Date of Patent: Jul. 17, 2018

(54) BALE FEEDER

(71) Applicant: Hustler Equipment Limited, Hastings (NZ)

(72) Inventor: Richard Currie, Hastings (NZ)

(73) Assignee: Hustler Equipment Limited, Hastings (NZ)

( * ) Notice: Subject to any disclaimer, the term of this patent is extended or adjusted under 35 U.S.C. 154(b) by 181 days.

(21) Appl. No.: 14/710,897

(22) Filed: May 13, 2015

(65) Prior Publication Data

US 2015/0327441 A1    Nov. 19, 2015

(51) Int. Cl.
    *A01K 5/00*    (2006.01)
    *A01F 29/00*    (2006.01)
    *A01F 29/06*    (2006.01)

(52) U.S. Cl.
    CPC ............ *A01F 29/005* (2013.01); *A01F 29/06* (2013.01)

(58) Field of Classification Search
    CPC ........ A01K 5/005; A01K 5/002; A01K 5/001; A01K 5/007; A01D 90/08; A01D 90/10; A01D 90/083; A01F 29/005; A01F 29/06; A01F 29/02; A01F 29/04
See application file for complete search history.

(56) References Cited

U.S. PATENT DOCUMENTS

| | | | | |
|---|---|---|---|---|
| 3,815,823 A | * | 6/1974 | Johnson | A01F 29/04 239/650 |
| 3,863,850 A | * | 2/1975 | Freeman | A01D 90/10 241/101.762 |
| 3,979,074 A | * | 9/1976 | White | A01F 29/005 241/101.5 |
| 2003/0075629 A1 | * | 4/2003 | Lucas | A01F 29/005 241/277 |
| 2009/0173051 A1 | * | 7/2009 | Aurora | A01D 34/53 56/14.7 |
| 2010/0219275 A1 | * | 9/2010 | Weiss | A01F 29/005 241/101.76 |
| 2015/0151303 A1 | * | 6/2015 | Stam | B02C 13/28 241/154 |
| 2015/0272012 A1 | * | 10/2015 | Roger | B02C 18/143 241/244 |
| 2017/0099778 A1 | * | 4/2017 | Dilts | A01F 29/095 |

FOREIGN PATENT DOCUMENTS

| | | |
|---|---|---|
| EP | 1 532 860 | 5/2005 |
| EP | 2 218 322 | 8/2010 |
| FR | 2 727 280 | 5/1996 |

\* cited by examiner

*Primary Examiner* — Trinh T Nguyen
(74) *Attorney, Agent, or Firm* — Merchant & Gould P.C.

(57) ABSTRACT

This invention relates to bale feeders and bale feeder drums. A lower drum and an upper drum have inter-engaging teeth which grip feed from a bale as they rotate. Lower bale feeder drum has inclined paddles and/or paddles with a tapering profile. The configuration of the paddles helps centralize bales during the feeding process, and helps to break up and stretch feed. The tapering profile of the paddles improves grip of feed by teeth on the drums.

11 Claims, 7 Drawing Sheets

BALE FEEDER

This application claims benefit of Serial No. 624955, filed 13 May 2014 in New Zealand and which application is incorporated herein by reference. To the extent appropriate, a claim of priority is made to the above disclosed application.

FIELD OF THE INVENTION

This invention relates to bale feeders and bale feeder drums. More particularly but not exclusively, the invention relates to a lower bale feeder drum having inclined paddles and/or paddles having a tapering profile.

BACKGROUND OF THE INVENTION

There is an increasing tendency to harvest hay in large bales, and various devices have been produced to aid in feeding out a line of forage for stock from these bales. Ordinarily the apparatus is supported on or towed by a tractor and is arranged to support the bale with some mechanism to feed out the hay from the bale as a line of loose hay suitable for consumption by stock.

Chainless bale feeders using rotating drums are known. The rotating drums catch feed and unravel a bale, gradually releasing feed (for example hay) onto a field. Ordinarily such bale feeders have two drums (a lower drum and an upper drum). The drums have teeth which inter-engage during rotation to grip feed. It is also known to provide lower drums with rows of paddles along the length of the drum in order to help to rotate/unwind the bale. Such paddles are particularly useful when feeding out sloppy bales. Ordinarily, paddles are uniform and symmetrical, and they are arranged in straight lines. A problem with this arrangement of paddles is that bales may become twisted during the feeding process, which impedes feeding of material.

It would be desirable for the drums to prevent unwanted twisting of bales and act to tease out and separate the feed such that it is fairly evenly distributed along the length of the drums. This makes it easier for stock to eat, and results in less wasted feed.

There a need to provide bale feeder drums which help centralise bales during the feeding process and prevent the bales from twisting during unravelling. There is also a need to provide bale feeder drums with improved gripping, stretching and breaking-up of bale material.

It is an object of the invention to provide an improved bale feeder drum and/or bale feeder or to at least provide the public with a useful choice.

SUMMARY OF THE INVENTION

According to one exemplary embodiment there is provided a bale feeder drum including: a plurality of groups of circumferentially spaced apart teeth provided at spaced intervals along the drum; and a plurality of paddles provided between ones of the groups of circumferentially spaced apart teeth wherein the paddles are inclined with respect to the axis of the drum from each end of the drum to the middle of the drum.

According to another exemplary embodiment there is provided a bale feeder drum including: a plurality of groups of circumferentially spaced apart teeth provided at spaced intervals along the drum; and a plurality of paddles provided between ones of the groups circumferentially spaced apart teeth wherein the paddles are inclined with respect to the axis of the drum and have a tapering profile along their length.

According to another exemplary embodiment there is provided a bale feeder including: a bale feeder drum as claimed in any one of the preceding claims arranged as a lower drum; and an upper drum having a plurality of groups of circumferentially spaced apart teeth provided at spaced intervals along the drum arranged to inter-engage with the teeth of the lower drum.

It is acknowledged that the terms "comprise", "comprises" and "comprising" may, under varying jurisdictions, be attributed with either an exclusive or an inclusive meaning. For the purpose of this specification, and unless otherwise noted, these terms are intended to have an inclusive meaning—i.e. they will be taken to mean an inclusion of the listed components which the use directly references, and possibly also of other non-specified components or elements.

Reference to any prior art in this specification does not constitute an admission that such prior art forms part of the common general knowledge.

BRIEF DESCRIPTION OF THE DRAWINGS

The accompanying drawings which are incorporated in and constitute part of the specification, illustrate embodiments of the invention and, together with the general description of the invention given above, and the detailed description of embodiments given below, serve to explain the principles of the invention.

DETAILED DESCRIPTION OF EMBODIMENTS OF THE INVENTION

Figure 1:
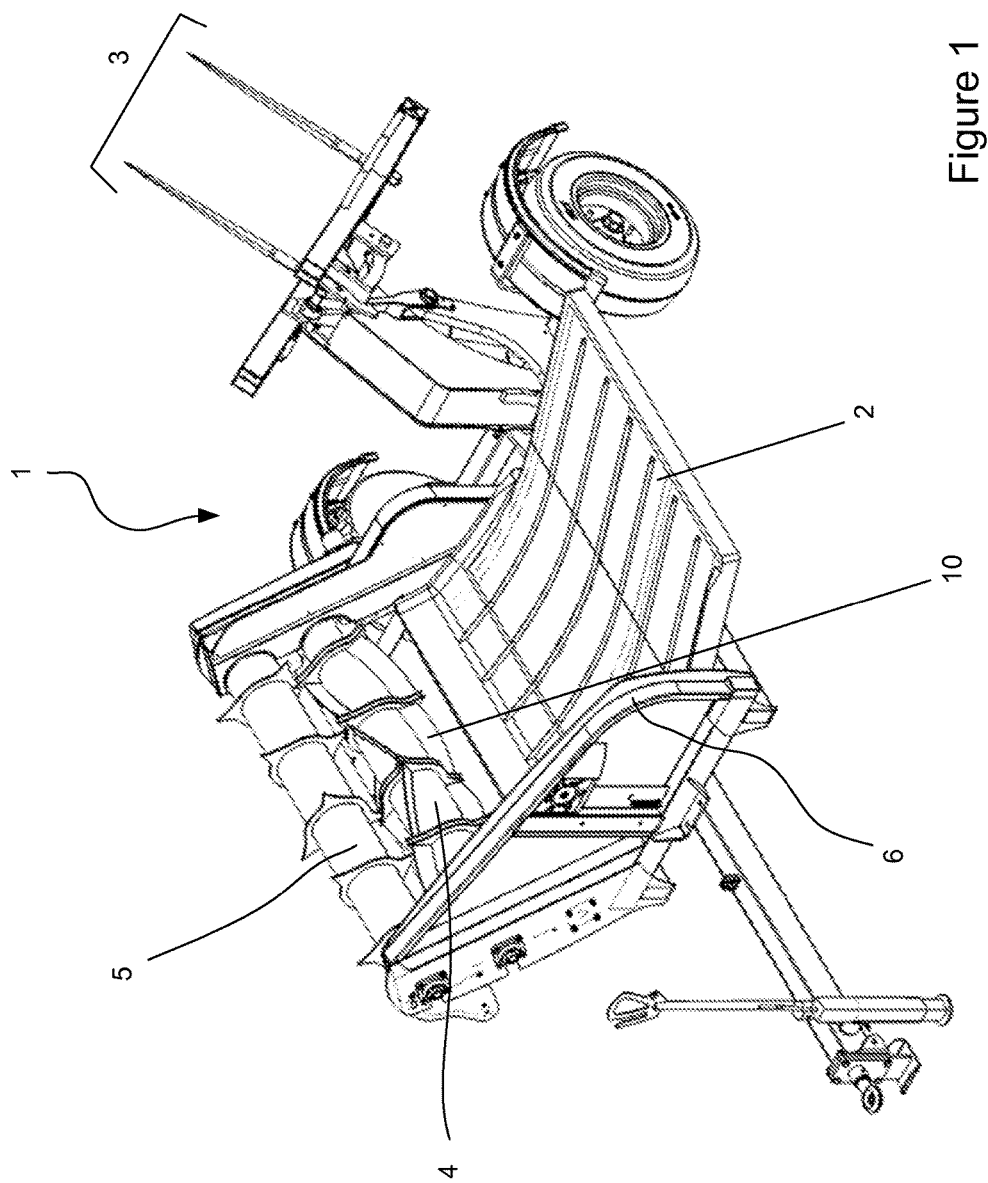
FIG. 1 shows an isometric view of a bale feeder according to an embodiment of the present invention.

FIG. 1 shows an embodiment of a bale feeder 1 according to the present invention. Bale feeder 1 includes a platform 2, tines 3, a lower bale feeder drum 4 and an upper bale feeder drum 5. A bale (not shown) can be picked up from the ground and lifted with tines 3. The tines 3 then place the bale on the platform 2. Other suitable methods of picking up and positioning bale are also possible (for example a gripper arrangement). The platform 2 can be moveable with respect to frame 6 and is adjustable to accommodate a wide range of bale types.

Bales are generally made of a cut and raked crop and can consist of a number of different materials. Examples include hay, cotton, straw or silage. Most commonly bales are provided in cylinder-shaped "round" or "rolled" shapes. Bales can also be provided in different shapes such as square or rectangular shapes. The invention is not limited with respect to the size, shape or material of bales that it feeds.

Once a bale has been loaded, the platform 2 moves to position the bale adjacent to lower bale feeder drum 4 and upper drum 5. Lower bale feeder drum 4 and upper drum 5 rotate in an outward direction to unwind a bale and release feed on the ground.

Figure 2:
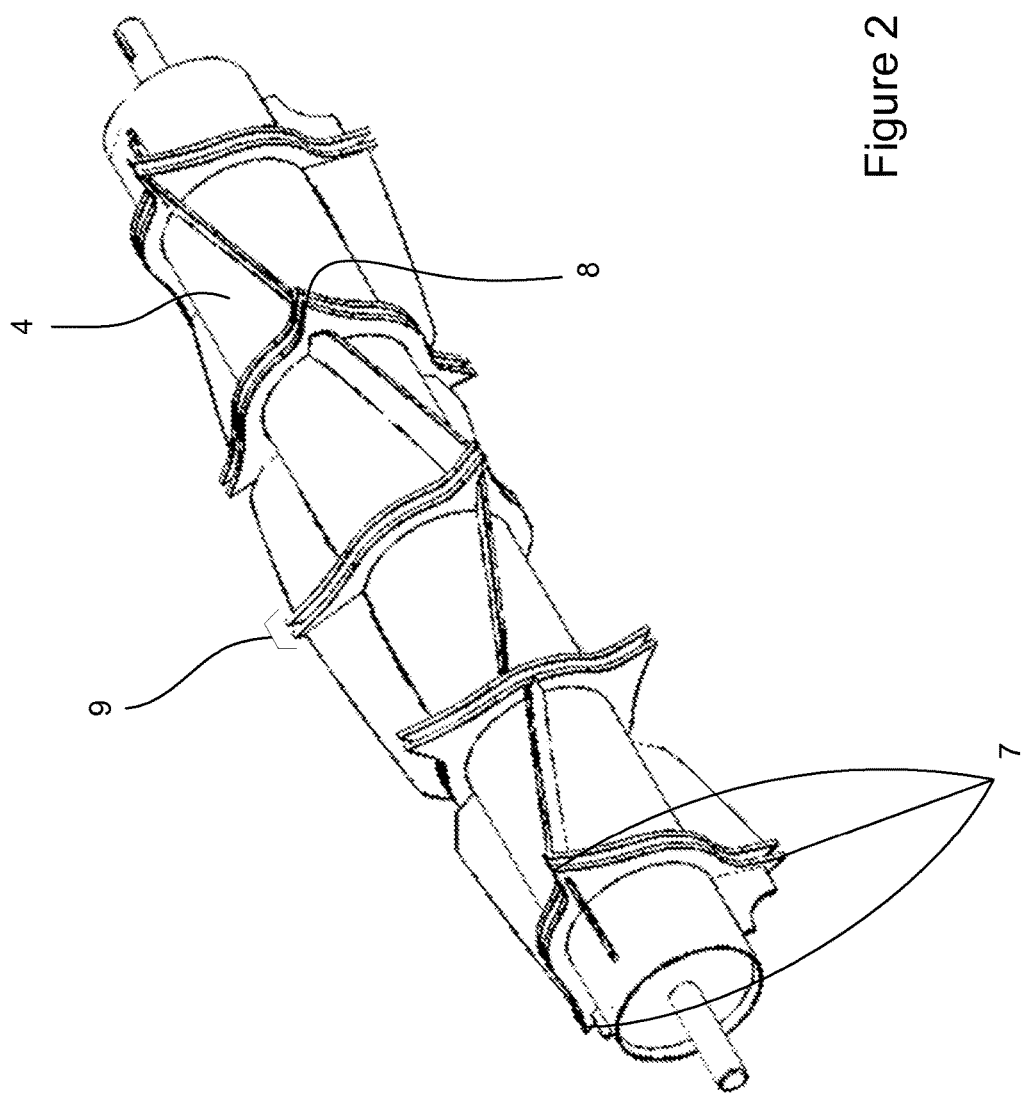
FIG. 2 shows an isometric view of a bale feeder drum according to a further embodiment of the present invention.

FIG. 2 shows a perspective view of lower bale feeder drum 4. In the shown embodiment the bale feeder drum 4 is generally cylindrical in shape, but any suitable shape may be provided.

The bale feeder drum 4 includes groups 7 of teeth 8. In the present embodiment, a tooth 8 has a generally isosceles triangle shape that is slightly inclined with respect to a radial axis of the drum 4. Teeth 8 are slightly inclined in a common direction of rotation of the lower drum 4. This tooth shape reduces the power required to feed out material and has improved penetration into a bale.

In the present embodiment, each group 7 of teeth 8 consists of three teeth 8, however any suitable number of teeth 8 may be provided. The teeth 8 may be evenly spaced around the circumference of the lower bale feeder drum 4, as in the present case, or they may be positioned in some other configuration around the circumference of the drum 4.

In the present embodiment the groups 7 of teeth 8 are provided in pairs 9. Each pair 9 consists of two groups 7 of teeth 8 which are located adjacent to each other with a small gap in-between. The groups 7 of teeth 8 within a pair 9 mirror each other (such that teeth 8 are aligned with one another).

Figure 3:
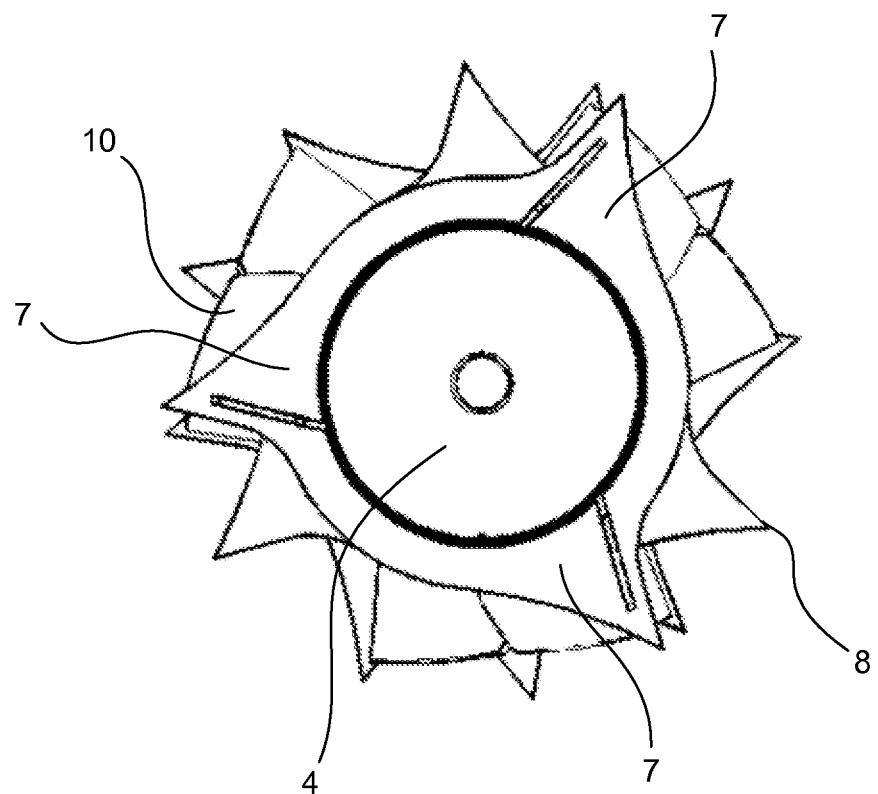
FIG. 3 shows an end view of the bale feeder drum of FIG. 2.
Figure 4:
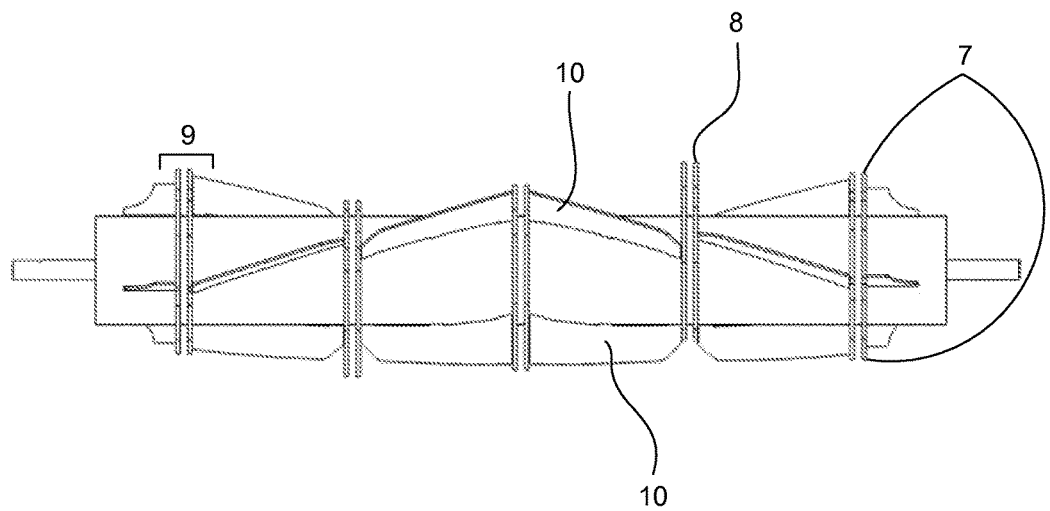
FIG. 4 shows a front view of the bale feeder drum of FIG. 2.

In contrast, different pairs 9 of groups 7 of teeth 8 are arranged such that different pairs 9 are offset from each other. FIG. 3 shows an end view of the bale feeder drum 4 with offset teeth 8 clearly shown.

Pairs 9 of groups 7 of teeth 8 are provided at uniform spaced intervals along the length of the drum 4. In the present embodiment five pairs are provided, but any suitable number of pairs 9 can be provided.

Other suitable shapes and/or configurations of teeth may also be used without departing from the concept of the present invention.

The drum 4 also includes a plurality of paddles 10, which are provided between the pairs 9 of groups 7 of teeth 8. These paddles 10 are inclined with respect to the axis of the drum 4 from each end of the drum 4 to the middle of the drum 4. The degree of inclination of the paddles 10 is approximately 18 degrees. Preferably the inclination would be in the range 9-20 degrees, but any suitable degree of inclination may be used. This inclined configuration of paddles 10 improves the gripping of hay by the paddles 10 due to an increased force over a smaller area.

In the present embodiment three paddles 10 are provided around the circumference of the drum 4 within each section (i.e. between two pairs 7 of groups of teeth). The paddles 10 are equally spaced from each other around the circumference of the drum 4.

A continuous row of paddles 10 is formed across sections along the length of the drum 4. The paddles 10 are arranged symmetrically about the middle of the drum 4 such that they form a "V" shape. This shape of rows helps centralize the bales as they are being fed out, since feed adjacent to the outer sides of drum 4 is pushed inwards towards the middle of drum 4 and the peak of the "V" by the paddles 10. This self-centering helps reduce the bouncing effect which may occur during feeding as the bale unravels. This prevents the bales from twisting during unravelling, which can hinder proper feeding of the bale. It also helps break-up and stretch the feed by better dispersing it along the length of the drum 4.

Figure 5:
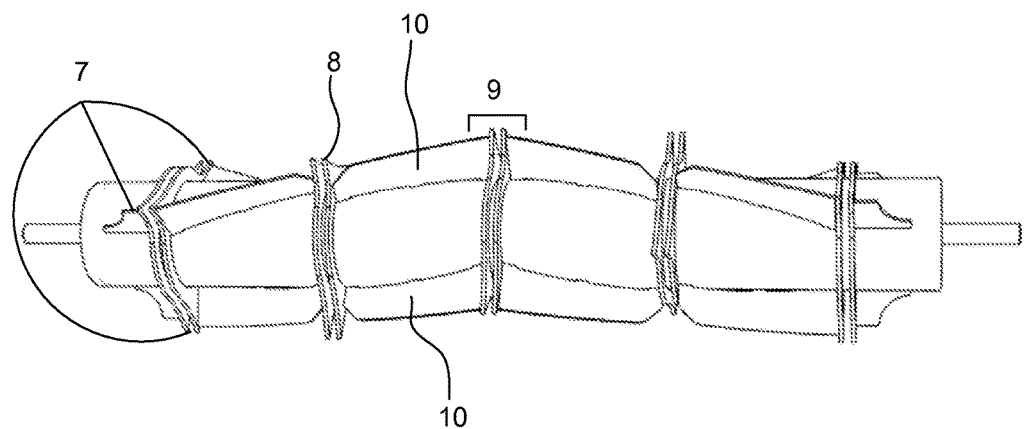
FIG. 5 shows a top view of the bale feeder drum of FIG. 2.
Figure 6:
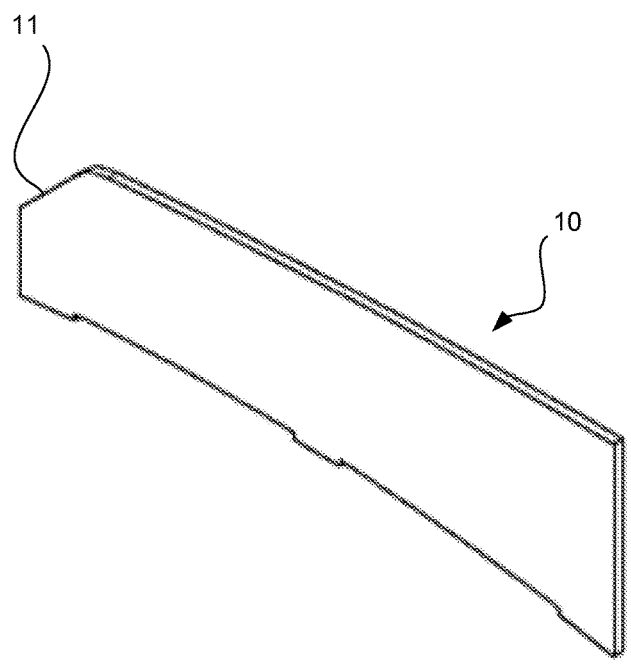
FIG. 6 shows an isometric view of a paddle according to an embodiment of the present invention.

Three "V"-shaped rows of paddles 10 are formed around the circumference of the drum 4. FIGS. 5 and 6 show the configuration of the three rows of paddles 10 around the drum 4.

Figure 7:
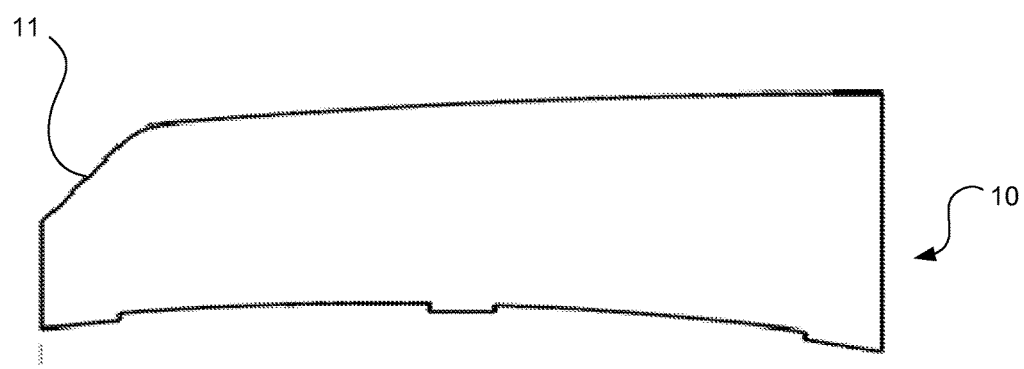
FIG. 7 shows a front view of the paddle of FIG. 6.

FIG. 6 shows a front view of a single paddle 10, with a tapering profile along the length of the paddle 10 to assist with clearance of material from the teeth. Each paddle preferably has a taper along the length of the bale engaging edge of between 4 to 11 degrees with respect to the edge engaging the drum 4. A chamfer 11 is visible on the upper left hand side of the paddle 10. FIG. 7 shows an isometric view of the paddle 10 in FIG. 6.

The two centermost paddles 10 are configured such that their non-chamfered ends face each other at the middle of the drum 4. The outermost paddles 10 are arranged such that their chamfered ends face the chamfered ends of the centermost paddles 10. There is thus provided a row of paddles 10 with two "V"-shaped recesses formed where the centermost and outermost paddles 10 meet. The tapering profile of paddles 10 facilitates the gripping of feed by the lower drum 4 by creating a greater point force.

Figure 8:
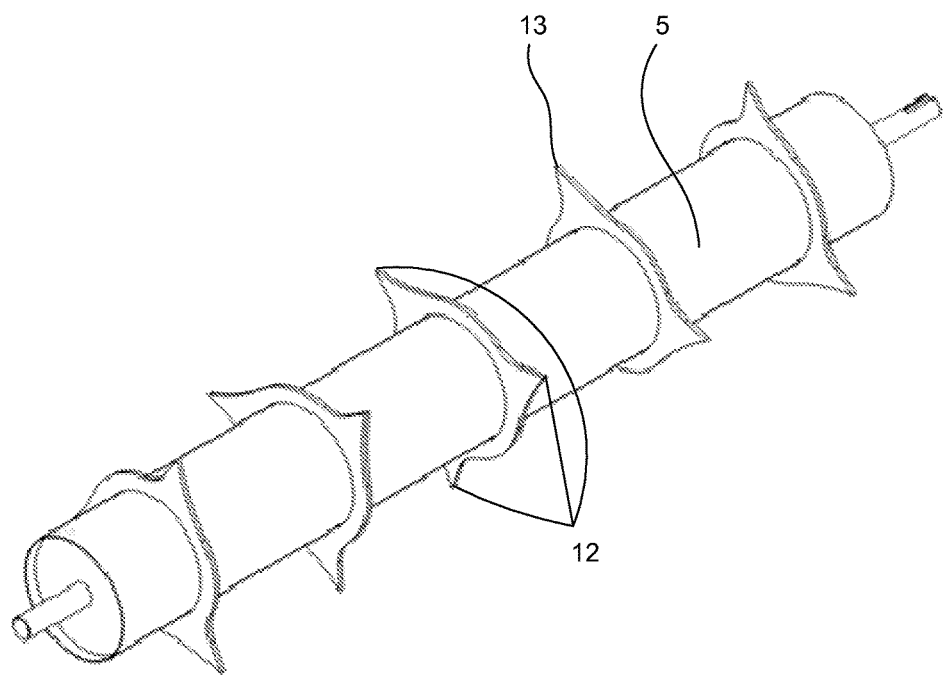
FIG. 8 shows an isometric view of a top bale drum according to an embodiment of the present invention.
Figure 9:
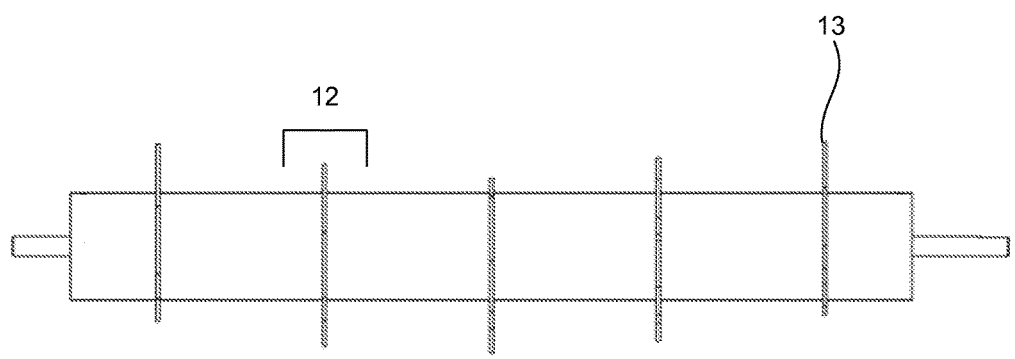
FIG. 9 shows a front view of the top bale drum of FIG. 8.
Figure 10:
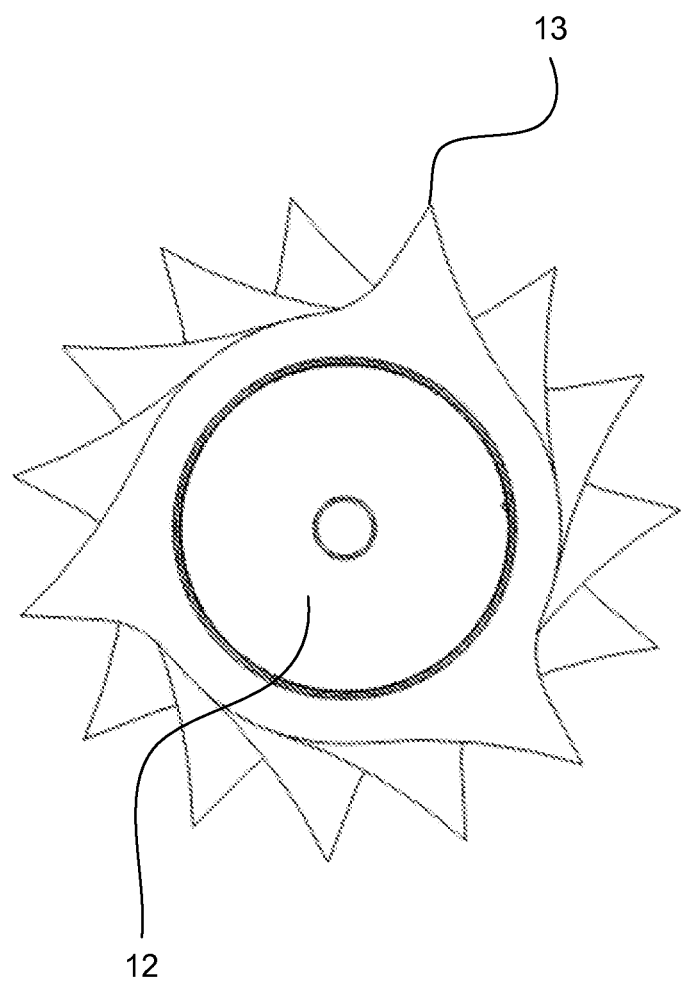
FIG. 10 shows an end view of the top bale drum of FIG. 8.

FIG. 8 shows an isometric view of an upper drum 5 according to an embodiment of the present invention. The upper drum 5 has a plurality of groups 12 of teeth 13, similar to the groups 7 of teeth 8 in the lower bale feeder drum 4. Unlike the groups 7 of teeth 8 on the lower bale feeder drum 4, the groups 12 of teeth 13 on the upper bale feeder drum 5 are not arranged in pairs 9. Teeth 13 on the upper drum 5 are arranged singularly at spaced intervals along the length of the upper drum 5. The groups 12 of teeth 13 on the upper drum 5 are arranged to inter-engage with the teeth 8 on the lower drum 4. In the present invention, teeth 13 on the upper drum 5 have the same shape (i.e. slightly inclined isosceles triangle) as those on the lower drum 4, but it is also conceivable for the teeth 13 on upper drum 5 to have a different shape to those on lower drum 4.

Teeth 13 on the upper drum fit between pairs 9 of teeth on the lower drum 4. This interengagement of teeth is visible in FIG. 1. In use, lower drum 4 and upper drum 5 rotate in the same direction (away from the bale), to feed out the bale. The rotation of the drums is not necessarily at the same speed, and preferably the rotation is configured such that teeth 13 on upper drum 5 meet teeth on lower drum 4 to grip the feed. For example, in the present embodiment with three teeth in a group, upper drum 5 may be configured to rotate three times faster than lower drum 4.

There thus provided a bale feeder drum which helps centralise bales during the feeding process and prevent the bales from twisting during unravelling. There is also provided a bale feeder drum with improved gripping, stretching and breaking-up of bale material.

While the present invention has been illustrated by the description of the embodiments thereof, and while the embodiments have been described in detail, it is not the intention of the Applicant to restrict or in any way limit the scope of the appended claims to such detail. Further, the above embodiments may be implemented individually, or may be combined where compatible. Additional advantages and modifications, including combinations of the above embodiments, will readily appear to those skilled in the art. Therefore, the invention in its broader aspects is not limited to the specific details, representative apparatus and methods, and illustrative examples shown and described. Accordingly, departures may be made from such details without departure from the spirit or scope of the Applicant's general inventive concept.

What is claimed is:

1. A bale feeder drum including:
   i. a plurality of groups of circumferentially spaced apart teeth provided at spaced intervals along the drum; and
   ii. a plurality of paddles provided between ones of the groups of circumferentially spaced apart teeth wherein the paddles are inclined with respect to the axis of the drum forming oppositely inclined continuous rows of paddles from each end of the drum to the middle of the drum, so that the paddles are symmetrically arranged in a V shape about the middle of the drum.

2. The bale feeder drum of claim 1 wherein each group of circumferentially spaced apart teeth includes three teeth.

3. The bale feeder drum of claim 1 wherein the groups of circumferentially spaced apart teeth are arranged in pairs.

4. The bale feeder drum of claim 3 wherein the groups of circumferentially spaced apart teeth within a pair mirror each other.

5. The bale feeder drum of claim 3 wherein pairs of groups of teeth are arranged such that the teeth are rotationally offset from each other about the drum.

6. The bale feeder drum of claim 3 wherein the bale feeder drum includes five pairs of groups of teeth.

7. The bale feeder drum of claim 1 wherein three paddles are provided between ones of the groups of circumferentially spaced apart teeth.

8. The bale feeder drum of claim 1 wherein the paddles are equally spaced from each other around the circumference of the drum.

9. The bale feeder drum of claim 1 wherein the paddles are inclined at an angle between 9-20 degrees with respect to the axis of the drum.

10. A bale feeder including:
    i. a bale feeder drum as claimed in claim 1 arranged as a lower drum; and
    ii. an upper drum having a plurality of groups of circumferentially spaced apart teeth provided at spaced intervals along the drum arranged to inter-engage with the teeth of the lower drum.

11. The bale feeder of claim 10 wherein teeth on the upper drum fit between pairs of teeth on the lower drum.

* * * * *